United States Patent [19]

Reddy et al.

[11] Patent Number: 5,225,228

[45] Date of Patent: Jul. 6, 1993

[54] BAKERY PRODUCT FROM DISTILLER'S GRAIN

[76] Inventors: James A. Reddy, 487 Taylor St., Twin Falls, Id. 83301; Roger Stoker, 27545 Paseo Toluca, San Juan Capistrano, Calif. 92675

[21] Appl. No.: 773,242

[22] Filed: Oct. 9, 1991

[51] Int. Cl.⁵ .................................................. A23L 1/10
[52] U.S. Cl. ..................... 426/618; 426/520; 426/624; 426/637; 426/656
[58] Field of Search ................. 426/618, 624, 656, 29, 426/31, 637, 520

[56] References Cited

U.S. PATENT DOCUMENTS

| | | | |
|---|---|---|---|
| 4,309,254 | 1/1982 | Dahlstrom et al. | 203/47 |
| 4,341,805 | 7/1982 | Chaudhary | 426/481 |
| 4,377,601 | 3/1983 | Dreese et al. | 426/472 |
| 4,828,846 | 5/1989 | Rasco et al. | 426/618 |
| 5,000,000 | 3/1991 | Ingram et al. | 435/161 |
| 5,061,497 | 10/1991 | Thacker et al. | 426/618 |
| 5,106,634 | 4/1992 | Thacker et al. | 426/618 |

OTHER PUBLICATIONS

*Supplementation of Wheat Muffins With Dried Distillers Grain Flour* by N. R. Reddy, M. D. Pierson and F. W. Cooler, from the Journal of Food Quality 9 (1986).

*Effects of Drying Technique and Incorporation of Soluble Solids on the Chemical Composition and Color of Distillers' Grain Products* by B. A. Rasco, M. Borhan and Y. Owusu-Ansah, CFW Research, The American Association of Cereal Chemists, Inc., vol. 34, No. 4, Apr. 1989.

*Body Composition and Serum and Liver Lipids in Rats Fed Distillers' Dried Grains*, by Faye M. Dong, Barbara A. Rasco, Sahl S. Gazzaz, Maria L. San Buenaventura and Liisa M. Holcomb, J. Sci. Food Agric., 1990, 51, 299-308.

*Baking Properties of Bread and Cookies Incorporating Distillers' or Brewer's Grain From Wheat or Barley*, by B. A. Rasco, G. Rubenthaler, M. Borhan, and F. M. Dong, J. Food Sci., 1990, 55(2), 424-429.

*Sensory Evaluation of Baked Foods Incorporating Different Levels of Distillers' Dried Grains With Solubles From Soft White Winter Wheat*, by Barbara A. Rasco, Ann E. Hashisaka, Faye M. Dong, and Margery A. Einstein, J. Food Sci., 1989, 54(2), 334-342.

*Consumer Acceptability and Color of Deep-Fried Fish Coated With Wheat or Corn Distillers' Dried Grains With Solubles (DDGS)*, by Barbara A. Rasco, Sharon E. Downey, Faye M. Dong, and Joyce Ostrander, J. Food Sci., 1987, 52(6), 1506-1508.

*Chemical Composition of Distillers' Dried Grains With Solubles (DDGS) From Soft White Wheat, Hard Red Wheat and Corn*, a Research Note, by Barbara A. Rasco, Faye M. Dong, and Ann E. Hashisaka, Sahl S. Gazzaz, Sharon E. Downey, and Maria L. San Buenaventura, J. Food Sci., 1987, 51(1), 236 and 237; and.

*Consumer Acceptability of Baked Goods Containing Distillers' Dried Grains With Solubles From Soft White Winter Wheat*, by B. A. Rasco, S. E. Downey, and F. M. Dong, Cereal Chem., 1987, 64(3), 139-143.

*Potato Processing*, Fourth Edition; edited by W. F. Talburt and O. Smith; Van Nostrand & Co.; 1987, pp. 661, 675-678.

*Primary Examiner*—R. B. Penland
*Attorney, Agent, or Firm*—Frank J. Dykas; Craig M. Korfanta; Ken J. Pedersen

[57] ABSTRACT

The invention is a method for preparing a bran from wet distiller's grain (WDG) or distiller's dried grain with solubles (DDGS). In the method sodium bicarbonate, amino acid and potato starch are added to the wet, solid residue from the fermentation of grain. Then, the residue-additive mix is blended and dried to produce a bran which may be utilized on a 50-50 weight basis with wheat flour, for example, in the manufacture of noodles and baked goods.

7 Claims, No Drawings

BAKERY PRODUCT FROM DISTILLER'S GRAIN

BACKGROUND OF THE INVENTION

1. Technical Field

This invention relates to a method for utilizing wet distiller's grain (WDG) or distiller's dried grain with solubles (DDGS), by-products of the alcohol manufacturing industry, in the preparation of bakery products for human consumption. WDG/DDGS results from the solid residue from fermentation of grain after removal of recoverable alcohol. Currently, WDG/DDGS is sold cheaply as animal feed. In our method, the solid fermentation residue is mixed with sodium bicarbonate ($NaHCO_3$), amino acid and potato starch before drying to produce a tasty, nutritious bakery product for human consumption.

WDG/DDGS produced from whole wheat in particular has shown promise as an ingredient in human food products. Due to its high protein and high dietary fiber (30-40 weight percent on a dry basis) content, WDG/DDGS can enhance the nutritional value of food products, particularly noodles and baked goods.

2. Background Art

U.S. Pat. No. 4,309,254 (Dahlstrom, et al.) discloses a process for producing alcohol from grain which creates wet distiller's grain (WDG) which is dried under pressure.

U.S. Pat. No. 4,341,805 (Chaudhary) discloses a process for producing a high protein and high dietary fiber product by drying and milling brewer's spent grain (BSG).

U.S. Pat. No. 4,377,601 (Dreese, et al.) discloses a process for making bread with bran produced by milling and screening BSG, and mixing the bran with oil and surfactant.

U.S. Pat. No. 5,000,000 (Ingram, et al.) discloses a process for producing ethanol from luriae broth containing sugars by fermenting the broth with a DNA-modified *E. Coli*.

In the prior art processes, however, products derived from WDG/DDGS for use as human food supplements have received limited positive consumer response due to negative taste, color and baking characteristics compared to those of ordinary wheat flour. For example, in U.S. Pat. No. 4,377,601 (Dreese, et al.) discussed above, the maximum amount of BSG bran utilized was 15 weight percent. From the practice of our process, on the other hand, the bakery product may contain as much as 50 weight percent WDG/DDGS.

DISCLOSURE OF INVENTION

What we have invented is a method for preparing a bran from wet distiller's grain (WDG) or distiller's dried grain with solubles (DDGS), which bran is suitable for use in products for human consumption, which comprises:

1. adding the additives sodium bicarbonate, amino acid and potato starch to the solid residue from the fermentation of grain;
2. blending the above residue-additive mix; and,
3. drying a product of the above blended mix.

Our invention also includes the above method wherein:
the grain is whole wheat;
the grain is from an ethanol production process;
the amino acid is lysine;
the amino acid is tyrosine;
the solid fermentation residue is wet (more than 50 weight percent water) when the additives are added.

Also, our invention is:
A bran comprising:
1. the solid residue from the fermentation of grain;
2. a small amount of sodium bicarbonate salt;
3. amino acid; and
4 potato starch.

Our invention also includes the above product wherein:
the grain is whole wheat;
the grain is from an ethanol production process;
the amino acid is lysine;
the amino acid is tyrosine;
the amino acid is a mixture of amino acids;
the product is about 50-90 weight percent solid grain residue;
the product has a trace amount of sodium;
the product is about 0.05 weight percent amino acid; and
the product is about 10-50 weight percent potato starch.

Our invention results in an inexpensive, tasty and nutritious bran-like bakery product which may be utilized on a 50-50 weight basis with wheat flour, for example, in the manufacture of noodles and baked goods.

BEST MODE FOR CARRYING OUT INVENTION

The primary raw material for our method and product is the solid residue from the fermentation of grain. In the manufacture of alcohol from gain, the grain is first ground and cooked with water. Then, malt is added as a source of enzyme to make a mash where the starch from the grain is converted into sugar. Generally, for beverage alcohol production, a solid grain residue is separated from the sugar-containing solution, or wort, to which solution yeast is added next to convert the sugar into alcohol by fermentation. This first solid grain residue is called brewer's spent grain (BSG). After the fermentation of the wort is complete, the alcohol is distilled off, leaving a watery residue called stillage, or distillery slop.

From the stillage the coarser grain particles are usually strained out, forming wet distiller's grain (WDG). The finer grain particles and water soluble components form what is known as thin stillage or thin slop. These may be concentrated by evaporation of the stillage and dried to form dried distiller's solubles. The concentrated dried distiller's solubles are often added to the BSG 20 or the WDG, and the mixture then dried to form distiller's dried grain with solubles (DDGS).

Generally, for fuel alcohol production, yeast is added with the malt-style enzyme in the mash, and the starch from the grain is converted to sugar and the sugar converted directly to alcohol in a fermenter. After the fermentation is completed, the coarser grain particles are usually strained out and the alcohol is distilled off, leaving a watery residue also called wet distiller's grain (WDG).

In our process, the primary raw material may be WDG from beverage or fuel alcohol production, or DDGS from beverage alcohol production. BSG, on the other hand, by itself is not an appropriate primary raw material. BSG is separated from the wort after the starch has been converted to sugar in the mashing step, but before the sugar in the wort is converted to alcohol. BSG does not contain solids and water soluble components resulting from the fermentation step. WDG and DDGS, on the other hand, contain essentially all the solids and water soluble components resulting from both the mashing and the fermentation steps. A comparison of the major constituents (on a dry basis) between BSG and WDG/DDGS is listed in Table I.

TABLE I

CONSTITUENTS
(Weight percent - dry basis)

| | Protein | Dietary Fiber | Crude Fiber | Lignin |
|---|---|---|---|---|
| Brewer's Spent Grain (BSG) | 29.0 | 52.5 | 12.5 | 3.4 |
| Wet Distiller's Grain or Distiller's Dried Grain with Solubles (WDG/DDGS) | 35.5 | 34.5 | 7.9 | 3.8 |

WDG/DDGS composition may vary due to the type of grain employed as the feedstock, and the specific process used to create and extract the alcohol.

EXAMPLE I

A whole wheat and water mixture for fermentation was prepared as follows:
1. Heating 310 gallons of water to 140° F by direct steam injection.
2. Adding 1,000 pounds of ground (⅛ inch screen and smaller) wheat to heated water.
3. Heating the mixture to 172° F. and adding 180 grams of Canalpha ® enzyme.
4. Agitating the mixture for 30 minutes while holding temperature at 172° F.
5. Heating the mixture to boiling and holding for 15 minutes. (NOTE: Total steam condensate added to mixture was 79 gallons.)
6. Cooling the mixture to 172° F. and adding 230 grams of Canalpha ® enzyme.
7. Holding the mixture at 172° F. and agitating for 30 minutes.
8. Cooling the mixture to 100° F. and adding 180 grams of Gasolase ® enzyme while maintaining agitation.
9. Continuing cooling and agitation to 94° F. and then adding 600 grams of preslurried yeast.
10. Mixing the yeast in for 10 minutes and then transferring the mixture to the fermenter.

EXAMPLE II

After fermentation of the mixture from Example I, above, according to conventional techniques, the alcohol produced was distilled off by heating the mixture in a distillation column. All the wet distiller's grain (WDG) from the fermenter and all the stillage from the bottom of the distillation column were drawn off, mixed and passed to a separate agitating tank where 40 pounds of sodium bicarbonate, 40 pounds of lysine amino acid, and 800 pounds of potato starch were added and the resulting mixture was blended thoroughly. Then, the agitating tank contents were drained through a strainer/filter and the separated wet solids passed to an evaporative dryer where the moisture content was reduced to less than about 12% weight percent, producing 2,040 pounds of a rough, granulated bran.

In our process, we add sodium bicarbonate (NaHCo₃) to the WDG/DDGS after the fermentation step. We use the sodium bicarbonate for two reasons: 1) to terminate the fermentation process, and 2) to leave a small amount of sodium bicarbonate salt in the dried bran product.

The sodium bicarbonate kills the yeast responsible for the fermentation. Also, after the bran is dried, at least some of the sodium bicarbonate salt, typically a small amount, remains absorbed on the surface of the bran, leaving a satisfying, slightly salty taste without the need for adding more salt. By sodium bicarbonate in this context, I mean the sodium salt component left after the straining or filtering and drying steps, typically in trace, or ppm amounts.

We prefer to add the sodium bicarbonate to the WDG/DDGS when it is still wet, that is, more than 50 weight percent water. This way, the sodium bicarbonate dissolves easily in the water, and is well-distributed in the residue-additive mix. Also, we prefer to strain or filter the wet residue-additive mix after the blending step and before the drying step. This way, excess water, with dissolved sodium bicarbonate, is easily and inexpensively removed. However, a small amount of the sodium bicarbonate is absorbed, and remains, on the surface of the bran after the straining or filtering and drying steps. We used 40 pounds of sodium bicarbonate for about 390 gallons of water in the system prior to fermentation. The relative amount of the sodium bicarbonate may be adjusted up or down depending on the amount of water used and the yeast population in the fermenter.

Also, we add amino acid to the WDG/DDGS to provide balanced nutrition in the dried bran product. By "amino acid" we mean any of the more than 80 amino acids found in nature, especially those 20 amino acids which are polymerized to form peptides and proteins, including, for example, lysine, tyrosine, aspartic acid, proline, asparagine, glutamine, aminobutyric acid, alanine and methionine, as well as mixtures thereof. We discovered these essential nutrients are not present in the WDG/DDGS in sufficient quantities for good human nutrition. Besides, our experience is that these amino acids aid in the human digestability of the high-protein WDG/DDGS. Therefore, to provide a nutritious, as well as tasty, bakery product, we add these nutrients in our process. We used 40 pounds of amino acid for 1000 pounds of grain in the system prior to fermentation.

Also, we add potato starch to the WDG/DDGS to provide palatability of the dried bran product. We used potato starch which is the dried solid product of potatoes after the protein, cellulosic material, sugars, minerals and water are removed. The potato starch provides long coils of amylose molecules which fold back on themselves and intertwine to form a stringy and cohesive starch sol for proper binding with the wet grain residue. Also, the potato starch contains phosphorous compounds which interfere with crossbonding of the amylose molecules to maintain these starch sol characteristics.

With our method, we expect to be able to use a higher percentage of potato component in the finished bakery product than has been previously obtainable with acceptable results in the past. For example, prior art breads have been baked with potato flour (containing starch, protein, cellulosic material, sugars and minerals) at the level of about 6 weight percent, relative to wheat flour, with higher levels of potato flour being undesirable (*Potato Processing, Fourth Edition;* edited by *W. F. Talburt and O. Smith; Van Nostrand Reinhold Company;* 1987 *pp.* 675-b 678). However, with our method, we expect to be able to use our bran on a 50-50 weight basis with wheat flour. When our bran is 40 weight percent potato starch then, the potato component of our bran is approximately 20 weight percent, much higher than the prior art breads. Also, the 40 weight percent potato starch version of our bran has much more potato component than even prior art candy gums, which comprise about 10-12 weight percent potato starch (*Potato Processing, supra., at p.* 661).

We used 800 pounds of potato starch for 1000 pounds of grain prior to fermentation. The relative amount of the starch may be adjusted up or down, depending upon the taste of the baker. Therefore, in our process, we utilize relatively large amounts of WDG/DDGS, a by-product from the fermentation of grain, as well as relatively large amounts of potato starch, a secondary product of the tablestock potato industry, to produce a nutritious, tasty bran for human consumption.

EXAMPLE III

The bran product from Example II, above, may be mixed on a 50-50 weight basis with ordinary whole wheat flour, and the mixture used to prepare attractive, tasty noodles and baked bread according to standard kitchen and bakery techniques.

While there is shown and described the present preferred embodiment of the invention, it is to be distinctly understood that this invention is not limited thereto but may be variously embodied to practice within the scope of the following claims.

We claim:

1. A method for preparing a bran from a solid fermentation wet distiller's grain (WDG) or distiller's dried grain with solubles (DDGS), which consisting essentially of:

adding sodium bicarbonate at about 0.05-5 weight percent, amino acid at about 0.05-5 weight percent and potato starch at about 10-50 weight percent in the form of additives to WDG or DDGS; blending the WDG/DDGS-additive mix; and drying the blended mix to form a bran suitable for use in products for human consumption.

2. The method of claim 1 wherein the grain is whole wheat.

3. The method of claim 1 wherein the grain is from an ethanol production process.

4. The method of claim 1 wherein the amino acid is lysine.

5. The method of claim 1 wherein the amino acid is tyrosine.

6. The method of claim 1 wherein the amino acid is a mixture of amino acids.

7. The method of claim 1 wherein the solid fermentation residue contains more than 50 weight per cent water when the additives are added.

* * * * *